April 21, 1925.  G. R. LIVERGOOD  1,534,229

FISHING TOOL

Filed July 12, 1924   3 Sheets-Sheet 1

G. R. Livergood Inventor

By Jesse P. Stone

Attorney

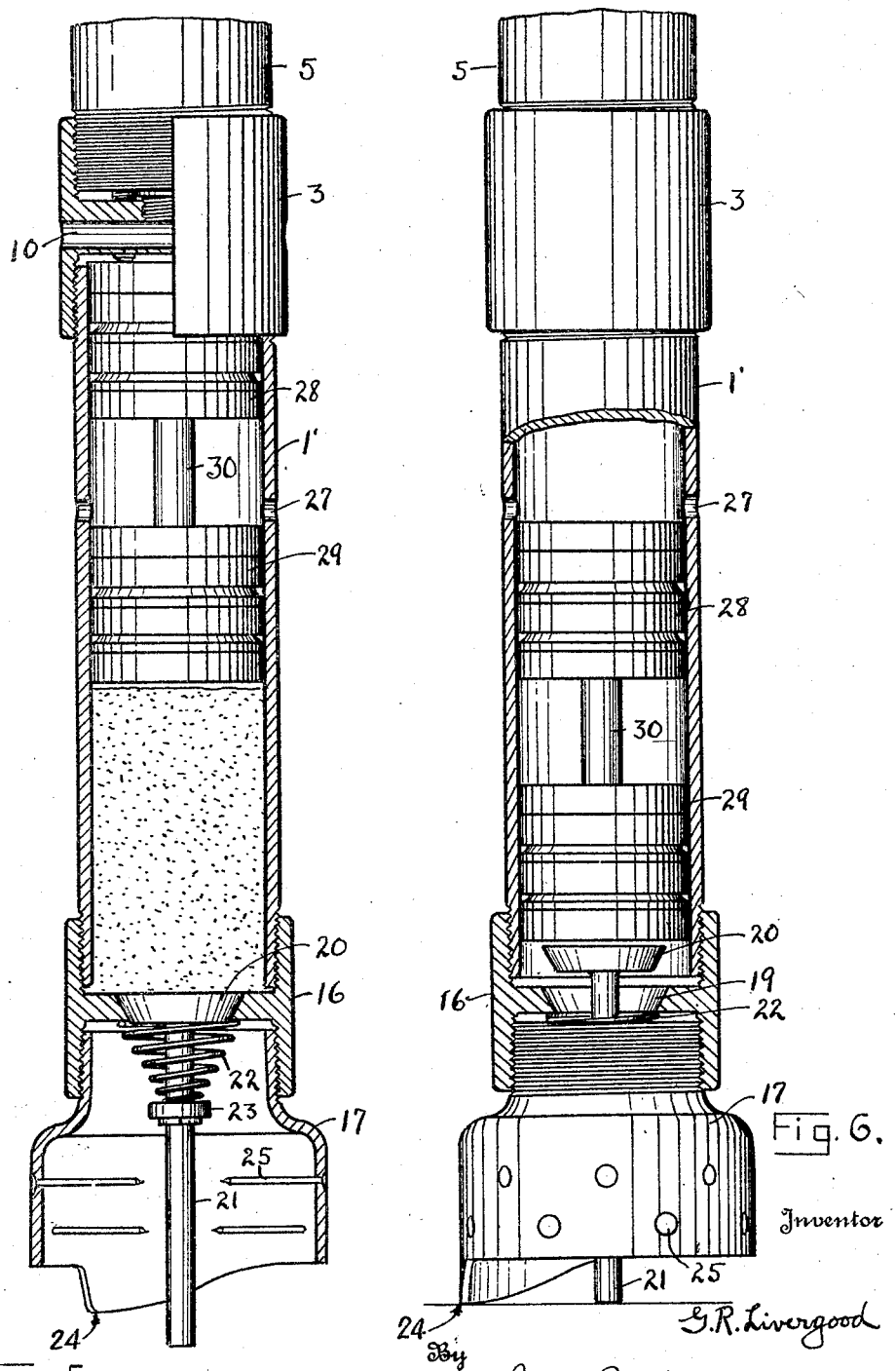

Patented Apr. 21, 1925.

1,534,229

UNITED STATES PATENT OFFICE.

GERALD R. LIVERGOOD, OF HOUSTON, TEXAS.

FISHING TOOL.

Application filed July 12, 1924. Serial No. 725,608.

*To all whom it may concern:*

Be it known that I, GERALD R. LIVERGOOD, a citizen of the United States, residing at Houston, Harris County, Texas, have invented a certain new and useful Improvement in Fishing Tools, of which the following is a specification.

My invention relates to fishing tools for use in well drilling operations and has particular reference to fishing tools for engaging small lumps of steel or tools broken off in the well, and retaining said broken parts so that they may be withdrawn from the hole.

It is an object of the invention to provide a device adapted to discharge a quantity of quick setting hydraulic cement about the fishing tool and the junk so that the broken parts will be embedded in the cement and may thus be withdrawn with the tool from the wall.

It is also desired to provide a fishing tool which may be operated positively without the assistance of springs or threaded parts and will thus be adapted to work effectively at all times.

Figure 1:
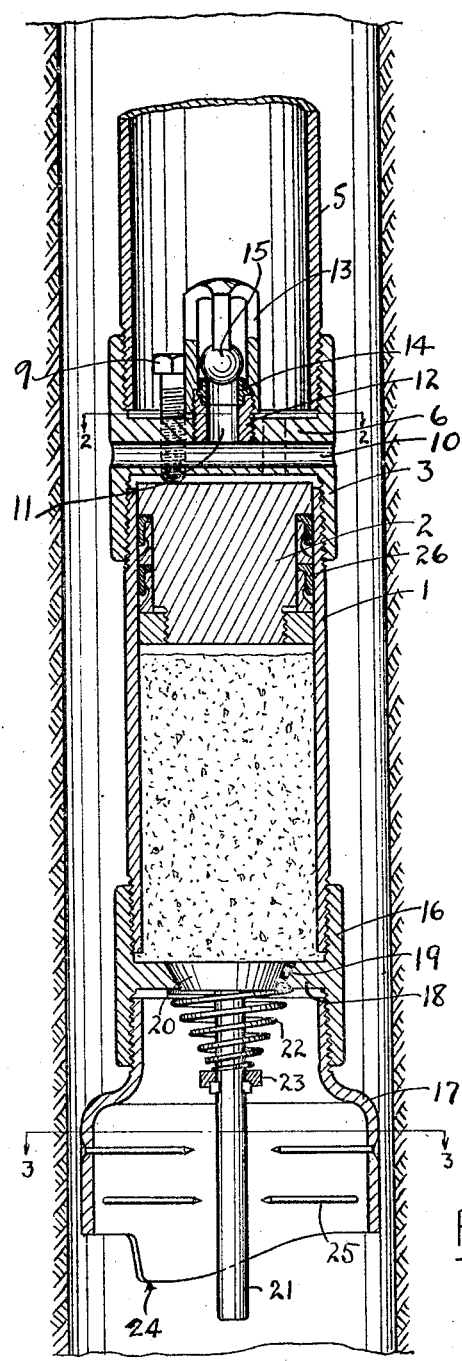
Figure 2:
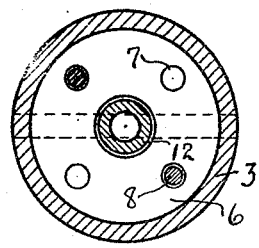
Figure 3:
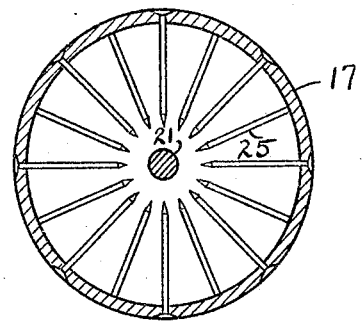
Figure 4:
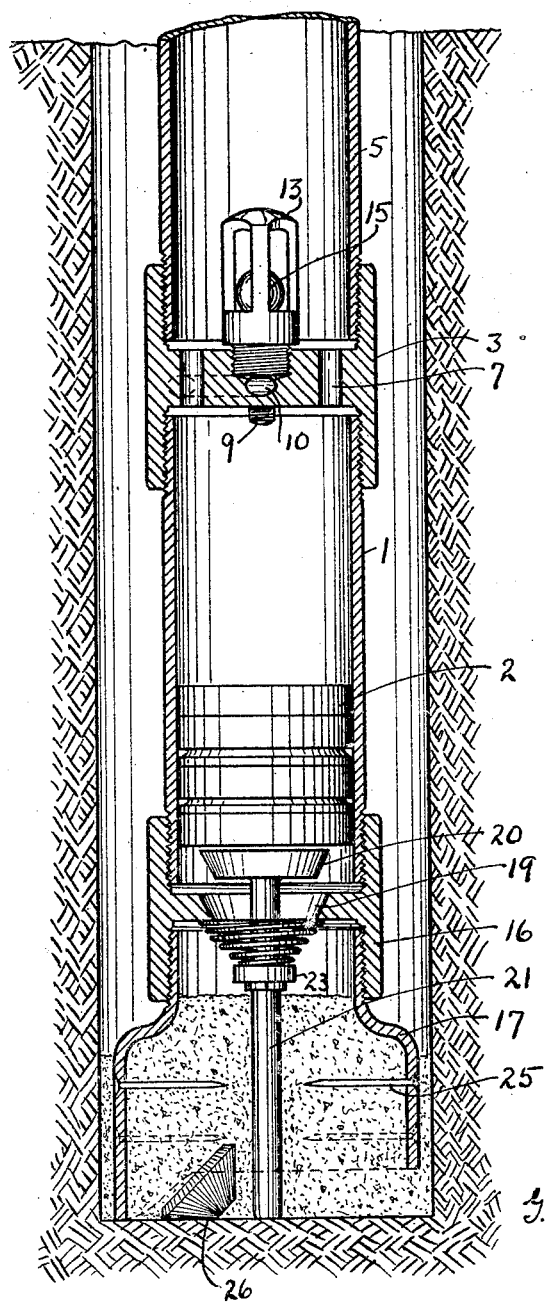

Referring to the drawings herewith Fig. 1 is a central longitudinal section through the tool constituting my invention shown as placed within a well hole. Fig. 2 is a transverse section on the plane 2—2 of Fig. 1. Fig. 3 is a similar section on the plane 3—3 of Fig. 1. Fig. 4 is a section similar to that shown in Fig. 1 illustrating the parts in different positions. Fig. 5 is a central longitudinal section through a slightly different embodiment of my invention certain parts being shown in elevation and Fig. 6 is a vertical section showing the upper and lower ends in side elevation and illustrating the parts in different position than shown in Fig. 5. Like numerals of reference are applied to like parts in all views.

In the device disclosed in Figs. 1 to 4, inclusive, I have shown a central section of pipe 1 forming a cylinder to receive a piston 2. The upper end of the cylinder 1 is screwed within the lower end of a special collar 3, the upper end of which is threaded at 4 for attachment to the drill stem 5. The collar 3 has a central partition or diaphragm 6 extending across the same and closing the passage therethrough except for 4 openings 7, 7 and 8, 8. The openings 7 provide a passage for flushing fluid, which may be pumped down from the surface in the usual manner. The openings 8 are threaded to receive set screws 9, which are adapted to project through the partition 6 so as to regulate the position of the piston 2, as will be later described.

There is also a diametrical opening 10 extending through the partition 6 of the collar, and this opening is connected at its central point with an upper passage 11. This passage is formed by a threaded nipple 12 screwed into the said partition and having connected therewith a valve cage 13, which holds in position a valve seat 14 in which is placed a ball valve 15.

At the lower end of the cylinder 1 is a collar 16, which is connected at its lower end with a swedged nipple 17. A central partition 18 extends across coupling 16 and has a certain valve seat 19 to receive a valve 20. The said valve has a downwardly extending stem 21, which is of sufficient length to project beyond the lower end of the nipple 17.

The valve 20 is held within its seat by a spiral spring 22, bearing at its upper end against the plate or partition 18 and at its lower end against a collar 23 secured rigidly to the valve stem 21, as shown in the drawing.

The swedged nipple 17 forms a shoe for the lower end of the device, and is formed with a downward projection 24, so that it may better be rotated into position at the bottom of the hole to engage the broken parts which are to be removed, and I also provide a plurality of pins 25 extending through the wall of the shoe 17 in a radial direction, the purpose being to provide a retaining means for the cement which is to be employed.

The piston 2 has cups 26 thereon to engage the inner walls of the cylinder 1 in the usual manner.

When this device is to be operated the cylinder 1 is filled with a quick setting hydraulic cement, and the piston is then placed in the upper end of the cylinder and the set screws 9 are adjusted to force the piston downwardly against the cement so that there will be no liability of the mud or water being forced into the cylinder during its descent into the well. The other parts are then assembled into position and the tool is introduced in the well until the valve stem 21 contacts with the bottom of the hole. The shoe 17 will be forced downwardly against the bottom, and the device will be ready for operation. During the passage of the tool into the well the mud and water in the hole may pass inwardly through the channel 10 and past the valve 15 into the drill stem.

The pumps are then operated to force flushing fluid downwardly through the drill stem and the openings 7 in the partition 6 to exert a pressure upon the piston 2. The valve 15 will close so that the full pressure of the pumps may be exerted upon the piston. The piston will thus force the cement through the shoe 17 and past the valve 20 and fill the lower end of the hole as shown in Fig. 4. Any broken pieces of tools such as shown at 26, will be embedded in the cement and the inwardly projecting pins 25 of the shoe 17 will also be embedded in the cement, so that when the cement is properly set the complete device may be rotated slightly to free it from the wall of the hole and the device may be withdrawn bringing with it the pieces of junk.

It will be obvious that this type of tool may be constructed cheaply and operated without difficulty. It obtains a firm grip upon the pieces of broken metal in the hole and when the tool is withdrawn the broken pieces are included and there is no further danger of their becoming loosened and dropped. It will be noted that this device will operate positively and is not dependent upon springs or upon the rotation of the pipe, and for this reason will work effectively on each operation. It will be cheap and economical to use and efficient in its working.

In the construction shown in Figs. 5 and 6, the parts are practically identical with those shown in the previous embodiment, except that the cylinder 1' is considerably longer and is formed with a plurality of openings 27 suitably spaced somewhat above the middle portion of the length of the cylinder. The piston 28 is also formed with a plunger 29 connected therewith by a connecting rod 30.

This construction of the cylinder and the piston therein enables the operator better to determine when the cement is fully discharged from the cylinder. Thus, when the pressure of the pumps is exerted upon the piston to force the cement from the device, the pressure will be exerted upon the piston 28, which will force the plunger 29 and the cement downwardly until the cement is entirely discharged. At this point the upper end of the piston 28 will reach the position shown in Fig. 6 so that the flushing fluid may be discharged through the openings 27 behind the piston. The operator will thus determine by the action of his pump when the piston has been forced downwardly a sufficient distance to relieve the pressure on the cylinder by the discharge of the fluid through the openings 27. The operator will then shut off his pump and wait for the cement to set, after which the tool may be withdrawn.

The operation of the device will now be clear without further description. What I claim as new and desire to protect by Letters Patent is:

1. In a fishing tool for wells, a cylinder, a piston therein, a valve-controlled opening below said piston, a shoe secured to the lower end of said cylinder, a closure for the upper end of said cylinder having openings therein for the passage of flushing fluid and means to raise the valve from its seat in said opening when the device is lowered to the bottom of the well, whereby flushing fluid may be pumped through said openings against said piston to force it downwardly within said cylinder, for the purpose described.

2. In a fishing tool for wells, a cylinder adapted to contain a charge of cement, a piston therein about said cement, a drill stem, a collar between said drill stem and said cylinder, said collar having a partition therein with openings in said partition to allow the passage of flushing fluid therethrough, a shoe secured to the lower end of said cylinder, a partition at the lower end of said cylinder having a valve closed opening therein, means to hold said valve at its seat, and means to raise said valve from its seat operated by contact with the bottom of the hold.

3. In a fishing tool for wells, a cylinder for hydraulic cement, a piston in said cylinder, a valve controlled closure for the lower end of said cylinder, a partition above said cylinder having passage therethrough for flushing fluid, means in said partition to control the passage of fluid upwardly into the drill stem above said partition, and means to automatically unseat said valve.

4. In a fishing tool for wells, a cement retaining shoe, a collar on said shoe, a cylinder on said collar, a piston in the upper end of said cylinder automatically opening means to retain cement in said cylinder, and means to force said piston downwardly on said cement.

5. In a fishing tool for wells, a collar having a central valve seat therein, a valve in said seat, a downwardly extending stem on said valve, a shoe on said collar around said valve stem, inwardly projecting radial pins in said shoe, a cylinder above said collar for cement and means to force said cement past said valve when said valve stem comes into contact with the bottom of the well.

6. In a fishing tool for wells, a guide shoe, a container thereon for cement, means to retain said cement in said container while it is being lowered into the well, means to force said cement from said container into said shoe and means to retain said cement in contact with said shoe.

7. In a fishing tool for wells, a guide shoe, a collar thereon, an upwardly opening valve in said collar, a cement containing cylinder on said collar, means to raise said valve when the shoe is on the bottom of the well, and means to force said cement past said valve.

8. In a fishing tool for wells a container for cement, an automatically opening valve at the lower end of said container, hydraulically operated means to force said cement from said container, and means below said container to retain said cement in engagement with said tool.

9. In a fishing tool for wells a guide shoe, a cylinder above said shoe, means to retain cement in said cylinder, means to release said cement at the bottom of the well, means to discharge said cement and means to withdraw said tool and cement from the well.

In testimony whereof I hereunto affix my signature this 9th day of July, A. D. 1924.

GERALD R. LIVERGOOD.